US006605314B2

United States Patent
Lessner et al.

(10) Patent No.: US 6,605,314 B2
(45) Date of Patent: Aug. 12, 2003

(54) METHOD OF APPLYING MASKING MATERIAL

(75) Inventors: Philip Michael Lessner, Simpsonville, SC (US); Peter Fernstrom, Easley, SC (US); Brian John Melody, Greer, SC (US); John Tony Kinard, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 10/014,435

(22) Filed: Dec. 14, 2001

(65) Prior Publication Data

US 2002/0076484 A1 Jun. 20, 2002

Related U.S. Application Data

(60) Provisional application No. 60/255,151, filed on Dec. 14, 2000.

(51) Int. Cl.[7] .................................................. B05D 5/12
(52) U.S. Cl. .......................... 427/79; 427/282; 427/287; 427/385.5; 427/387; 427/388.1; 427/421
(58) Field of Search .......................... 427/79, 282, 287, 427/385.5, 387, 388.1, 421

(56) References Cited

U.S. PATENT DOCUMENTS

| 5,560,543 | A | | 10/1996 | Smith et al. | |
| 6,013,549 | A | * | 1/2000 | Han et al. | 438/253 |
| 6,262,877 | B1 | * | 7/2001 | Mosley | 361/306.2 |
| 6,316,289 | B1 | * | 11/2001 | Chung | 438/118 |

FOREIGN PATENT DOCUMENTS

| EP | 1 030 324 | 8/2000 |
| GB | 2 330 451 | 4/1999 |
| GB | 2 350 321 | 11/2000 |
| WO | WO 99 19900 | 4/1999 |

OTHER PUBLICATIONS

Patent Abstracts of Japan, Publication No. 09070792, Publication Date Mar. 18, 1997, 1 page.
International Search Report for PCT/US01/47652, dated Mar. 1, 2003, 4 pages.

* cited by examiner

*Primary Examiner*—Bernard Pianalto
(74) *Attorney, Agent, or Firm*—Banner & Witcoff, Ltd.

(57) ABSTRACT

A method of preparing a capacitor having at least one porous element comprising applying to the element a masking material with an ink jet printer head. Preferably the masking material is a liquid resin such as an acrylic, a polyurethane, a silicone, or a polyimide.

11 Claims, 1 Drawing Sheet

METHOD OF APPLYING MASKING MATERIAL

This application relates to and claims priority from U.S. Provisional Application Serial No. 60/255,151, filed Dec. 14, 2000, herein incorporated by reference.

FIELD OF INVENTION

This invention relates to applying masking lines to porous capacitor elements without mechanical contact and with minimal material waste.

BACKGROUND OF THE INVENTION

Solid capacitors contain elements fabricated from a porous valve metal foil and a conductive polymer counter electrode. The elements are stacked together to form the capacitor. FIG. 1 depicts several elements (1) attached to a process bar (6). Each element has an anode (2) and a cathode (3). Two masking layers (4) and (5) are also applied to the elements. The elements can be fabricated from any valve metal foil, typically tantalum, niobium, or aluminum. Aluminum is the preferred material.

FIG. 2 depicts a flowchart of the steps to manufacture the element and the final capacitor device. The foil is first etched (10) and formed (11) using conventional techniques such as by passing rolls of foil through etching and forming baths. These rolls are typically from a few hundred millimeters to a few meters wide. The formed foil is then slit (12) into narrower rolls the width of the final element. After this slitting, the foil is cut to a length convenient for further processing (13). The resulting elements are attached to a process bar for carrying them through the subsequent steps of processing (14). The material of the process bar is typically aluminum or stainless steel.

During the slitting and cutting to length operations, the dielectric oxide on the element edges is damaged and bare metal is exposed. If a cathode material is applied over the edges of the elements, a short circuit would occur and the capacitor would have an extremely high leakage current. Therefore, new dielectric oxide needs to be formed on the cut edges of the element. This can be accomplished by immersing the elements in a formation bath or a series of formation baths. However, if the elements attached to the process bars are simply immersed in the formation electrolyte, the electrolyte will wick up to the process bar. This wicking is undesirable because the material of the process bar will form an oxide instead of the edges of the foil and impurities from the process bar can contaminate the formation electrolyte. Thus a barrier needs to be placed between the top of the element and the process bar. This barrier can take the form of a non-conductive masking material (15).

After forming the edges of the element (16), the cathode material is applied (18). Typically, the cathode material is manganese dioxide or an intrinsically conductive polymer material. The cathode is conventionally applied by a series of dipping and heating operations. In order to prevent the cathode material from touching the anode portion of the capacitor and causing a short circuit, the anode portion of the capacitor needs to be separated from the cathode portion by a barrier layer. This layer can be the masking layer applied to prevent the electrolyte from wicking up to the process bar or more preferably can be an additional masking layer applied below the first masking layer (17).

After the application of the cathode material, carbon paint (19) and silver paint (20) are applied to complete the fabrication of the elements. The elements are then cut from the process bar (21). The cathode end of the element is attached to one side of a lead frame while the anode side of the element is attached to the other side of the lead frame (22). Optionally, multiple elements can be stacked on top of another to form a multi-layer capacitor. Finally, the elements are encapsulated in a non-conductive molding compound (23).

The need to provide an insulating barrier or masking layer was recognized by Harakawa, et al. (U.S. Pat. No. 4,805,074). Harakawa, et al. teach an insulating "resist" layer to separate the anode from the cathode, but do not provide a method of forming this layer.

More recently, Kuranuki, et al. (EP 0 634 761 and EP 0 634 762) proposed an adhesive insulating tape, such as a heat resistant polyimide tape, be applied as the insulating layer. A disadvantage of the adhesive tape is that the adhesive on the tape may not penetrate the pores of the foil and, therefore, allow material to wick up.

Monden, et al. recognize that application of a liquid resin followed by curing of this resin would provide penetration of the insulating resin into the pores and prevent the material from wicking up (Japanese Patent Application H11-123598). Nitoh, et al. propose to apply the resin using a metal wheel (Japanese Patent Application H11-123599). This method and apparatus require that the metal wheel be in contact with the capacitor element. This could cause damage to the dielectric oxide film and also potentially bend the element. Additionally, there is a restriction on how close the masking line can be to the process bar causing waste of metal foil. Furthermore, it is difficult to supply material to this wheel to provide only a small waste of masking material.

SUMMARY OF THE INVENTION

A method of preparing a capacitor having at least one porous element comprising applying to the element a masking material with an ink jet printer head. Preferably the masking material is a liquid resin such as an acrylic, a polyurethane, a silicone, or a polyimide.

DETAILED DESCRIPTION OF THE INVENTION

Figure 1:
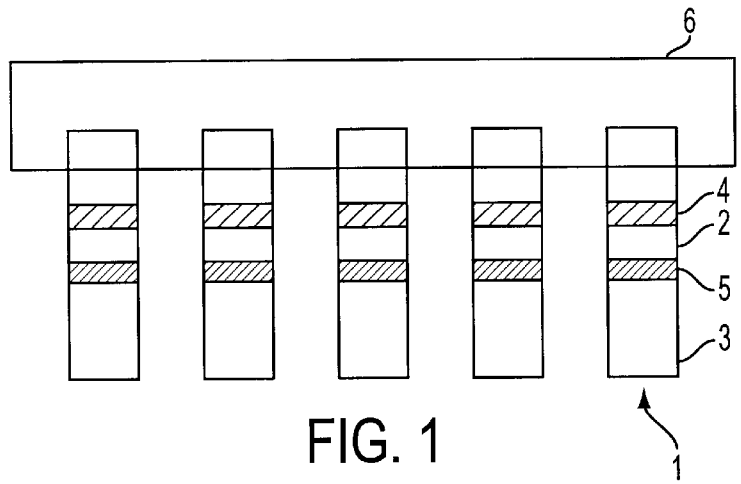
FIG. 1 depicts several elements attached to a process bar.
Figure 2:
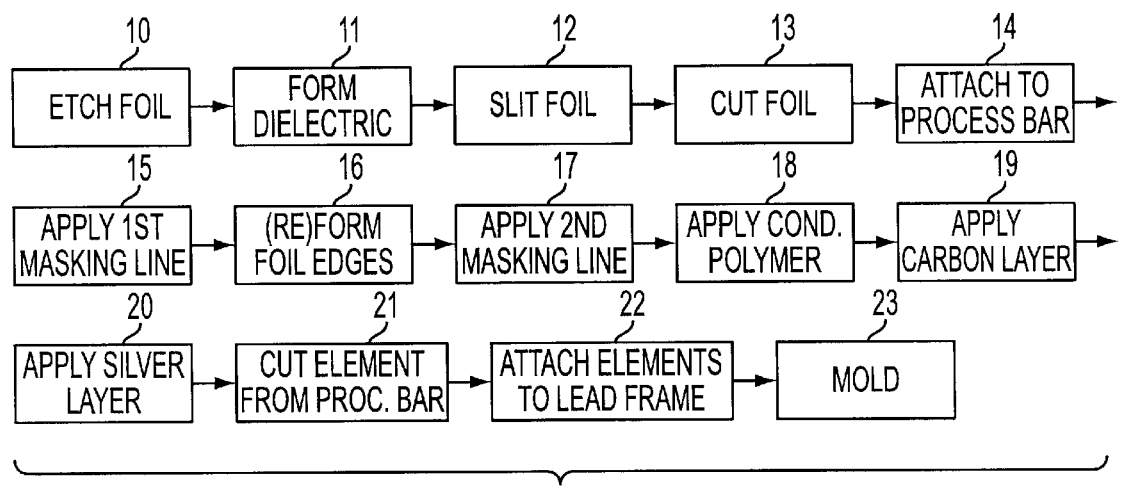
FIG. 2 depicts a flowchart of the steps to manufacture an element and a final capacitor device.

The invention is directed to applying a masking layer to an element by spraying a liquid resin material on the element surface using ink-jet printing. Ink-jet printing applies liquid materials to a surface without making mechanical contact with the surface. Because the ink-jet printing heads do not make mechanical contact with the surface of the element, no mechanical damage to the dielectric layer will occur. Further, since the ink-jet nozzles can be programmed to turn on and off very rapidly, the resin can be applied with very little material waste. Moreover, the resin can be applied to a well-defined area of the element.

The liquid resin material can be any material that is capable of being dissolved or dispersed in a liquid medium. Examples of resin material include acrylics, polyurethanes, silicones, and polyimides. Preferred liquid resins are polyimides because of their heat and chemical resistance. Precursors of polyimides, such as polyamic acids, can also be used. The polyimide would then be formed upon curing the polyamic acid.

The solids content of the liquid resin material can be from 1 to 50%. Preferably, for ink-jet coating applications, the solids content is from 5 to 30%.

In demand mode ink-jet printing, droplets of material are generated at an orifice by either displacement of a piezoelectric material coupled to the fluid or by heating the fluid with a resistive element and forming a vapor bubble. These volumetric changes cause a drop of fluid to be formed at the orifice. The droplet diameter is approximately equal to the orifice diameter. By adjusting the modulation waveform, the droplet volume can be varied severalfold. Thousands of droplets can be generated per second. Ink-jet printing has been applied to printing of solder bumps and dielectric polymers for fabrication of multi-chip modules and chip-scale packages (Hayes, et al. "Micro-Jet Printing of Solder and Polymers for Multi-Chip Modules and Chip-Scale Packages," IMAPS '99).

To apply the masking material to a porous element of a capacitor, the ink-jet print head is filled with liquid resin material. The computer-controlled ink-jet head is scanned over the surface of the element. A multitude of individual droplets is applied to the surface. Due to surface tension effects and wicking, these individual droplets meld into a continuous line of liquid resin. After applying the liquid resin, the elements are dried in an oven to drive off any remaining solvent and cure the coating.

A typical line width would be 0.6 mm and a typical coating thickness would be 20 microns. However suitable widths may be from about 0.3 mm to about 1.1 mm, and suitable thicknesses are from about 10 microns to about 50 microns.

The elements can be fabricated from any valve metal foil, typically tantalum, niobium, or aluminum. Aluminum is the preferred material.

We claim:

1. A method of preparing a capacitor having at least one porous foil element comprising forming a dielectric on the element; slitting and cutting the element; applying a masking material to the element, and reforming edges of the element; wherein the masking material is applied with an ink jet printer head to prevent wicking of reforming electrolyte during reforming.

2. The method of claim 1 wherein the masking material is a liquid resin.

3. The method of claim 2 wherein the liquid resin is an acrylic, a polyurethane, a silicone, or a polyimide.

4. The method of claim 3 wherein the liquid resin is a polyimide.

5. The method of claim 4 wherein the polyimide is formed by applying a polyamic acid to the element and then curing.

6. The method of claim 1 wherein the liquid resin has about 1 to about 50% resin solids.

7. The method of claim 6 wherein the liquid resin has about 5 to about 30% resin solids.

8. The method of claim 1 wherein the porous element comprises aluminum.

9. The method of claim 1 further comprising curing the masking material.

10. The method of claim 9 wherein the masking material is cured in an oven.

11. The method of claim 1 wherein the porous element comprises tantalum or niobium.

* * * * *